United States Patent [19]

Young

[11] 4,447,253

[45] May 8, 1984

[54] TOPICAL FERTILIZATION METHODS AND COMPOSITIONS FOR USE THEREIN

[75] Inventor: Donald C. Young, Fullerton, Calif.

[73] Assignee: Union Oil Company of California, Los Angeles, Calif.

[21] Appl. No.: 318,368

[22] Filed: Nov. 5, 1981

[51] Int. Cl.³ .............................................. C05C 9/00
[52] U.S. Cl. ..................................... 71/28; 71/64.08; 71/64.10; 564/39; 564/73
[58] Field of Search ............................... 71/11, 27–30, 71/40, 43, 64.08, 64.09, 64.10; 564/39, 63, 73, 75

[56] References Cited

U.S. PATENT DOCUMENTS

| | | | |
|---|---|---|---|
| 1,340,708 | 5/1920 | Fjellanger | 71/28 |
| 1,884,105 | 10/1932 | Moore | 423/549 |
| 3,459,499 | 8/1969 | Mullen, Jr. | 423/313 |
| 4,116,664 | 9/1978 | Jones | 71/29 |
| 4,214,888 | 7/1980 | Young | 71/28 |
| 4,310,343 | 1/1982 | Verdegaal et al. | 564/63 |

OTHER PUBLICATIONS

D. F. du Toit, Verslag Akad. Wetenschappen, 22, 573–574, (abstracted in Chemical Abstracts, 8, 2346, 1914).

L. H. Dalman, "Ternary Systems of Urea and Acids; I. Urea, Nitric Acid and Water; II. Urea, Sulfuric Acid and Water; III. Urea, Oxalic Acid and Water"; JACS, 56, 549–553, (1934).

Sulfur Institute Bulletin No. 10 (1964), "Adding Plant Nutrient Sulfur to Fertilizer".

William Lohry, "Techniques of Manufacturing Hot Mix Suspensions", National Fertilizers Association, "Round—Up Papers",(1968), pp. 34–38.

Primary Examiner—Ferris H. Lander
Attorney, Agent, or Firm—Dean Sandford; Gregory F. Wirzbicki; Michael H. Laird

[57] ABSTRACT

Improved liquid fertilizer compositions for applying urea to the soil surface contain urea-sulfuric acid reaction products having high $H_2SO_4$/urea molar ratios and are free of toxic components such as sulfamic acid normally associated with such products. The use of these compositions reduces or completely eliminates urea volatilization loss normally associated with topical urea fertilization, particularly in alkaline soils.

24 Claims, 4 Drawing Figures

EFFECT OF TEMPERATURE AND REACTION MEDIUM ON THE RATE CONSTANT, k, FOR REACTION OF GRANULAR UREA

TOPICAL FERTILIZATION METHODS AND COMPOSITIONS FOR USE THEREIN

BACKGROUND OF THE INVENTION

1. Field of the Invention

This invention relates to the field of topical fertilization with urea and particularly to improved liquid urea fertilizers and methods of topical fertilization, particularly in alkaline soils. The compositions are stable, homogeneous solutions which when topically applied to alkaline soils markedly reduce or completely eliminate urea losses by volatilization. Thus, they enable more efficient use of fertilizer nitrogen values and better control of nitrogen dosage on crops. The compositions and methods also otherwise improve soil characteristics due to the acidifying and nutrient effect of sulfuric acid.

2. Description of the Prior Art

Urea is widely used as a topical, subsurface and foliar fertilizer. Topical urea application on alkaline soils is known to result in the loss of nitrogen fertilizer values by volatilization, i.e., the ultimate conversion of urea to ammonia which escapes to the atmosphere.

Sulfuric acid has also been widely used in the agricultural industry as a soil adjuvant, a water penetration improving agent, a herbicide for a wide variety of vegetation, and as a selective herbicide on crops resistant to sulfuric acid such as onions and garlic.

Previous investigators have observed that urea, sulfuric acid, and, optionally, water can be reacted to form concentrated solutions of urea and sulfuric acid reaction products in which the urea is present as mono- and/or diurea sulfates. However, they did not recognize that this reaction can result in the formation of by-products that are toxic to plants such as sulfamic acid and ammonium sulfamate; the latter of which is a federally registered herbicide.

The urea-sulfuric acid reaction is so highly exothermic, particularly when solid urea and concentrated sulfuric acid are used as is necessary for purposes of economy, that it is difficult to control reaction temperature in the large volume production plants required to produce significant amounts of these products. In fact, it is essentially impossible to control reaction temperature and thus avoid formation of undesired by-products, during production of the higher acid content compositions having sulfuric acid/urea molar ratios greater than 0.7, with available methods. Furthermore, previous investigators did not recognize either the magnitude or importance of incipient product and/or reactant decomposition or the temperatures at which such decomposition occurs for products having different urea/sulfuric acid ratios. Their methods were not adequate to avoid incipient decomposition, particularly in the higher acid compositions, and they did not recognize the effect of such decomposition on process control or product quality.

These investigators also did not recognize that the use of urea-sulfuric acid reaction products having $H_2SO_4$/urea molar ratios of about 0.7 and higher markedly reduce and, in some cases, completely eliminate urea loss by volatilization even under the most adverse conditions of soil pH and ambient temperature.

D. F. du Toit found that urea formed certain compounds with oxalic, acetic, hydrochloric, nitric and sulfuric acids, and that the resulting compounds were stable in contact with their solutions at 20° C. Verslag Akad. Wetenschappen, 22, 573–4 (abstracted in Chemical Abstracts, 8, 2346, 1914).

L. H. Dalman expanded on du Toit's work by developing the phase relationships between the solid phase and saturated solutions at 10° C. (50° F.) and 25° C. (77° F.) but, as in the case of du Toit, did not develop or disclose methods capable of handling the high heat of reaction involved in large scale industrial processing. "Ternary Systems of Urea and Acids. I Urea, Nitric Acid and Water. II. Urea, Sulfuric Acid and Water. III. Urea, Oxalic Acid and Water"; JACS, 56, 549–53 (1934).

In the article "Adding Plant Nutrient Sulfur to Fertilizer," Sulfur Institute Bulletin No. 10 (1964), the Sulfur Institute discussed the addition of nutrient sulfur to fertilizers and mentioned that urea reacts with sulfuric acid to form two complexes of urea sulfate which are useful fertilizers.

Jones, U.S. Pat. No. 4,116,664 discloses what is referred to therein as a tortuous, multistage process of producing combinations of urea and sulfuric acid in which portions of the sulfuric acid are incrementally added to and reacted with the total amount of urea to be reacted in each of several stages until the total amount of sulfuric acid has been reacted with the urea. The resulting product is unstable and requires further processing. Jones preferably adds water later as required to obtain stability and the desired composition. He discloses that the reaction can be carried out at temperatures of 100° to 200° F. and that if the sulfuric acid is added to the total amount of urea at a rate which is too fast the temperature goes to about 200° to 225° F. and that a gas is emitted that causes changes in product characteristics such as solidification. The patent states that temperatures of 160° to 200° F. are preferred and that the products can be used as fertilizers.

Although these investigators disclosed several characteristics of urea-sulfuric acid combinations and methods of making those combinations, and that the products were useful soil adjuvants and/or fertilizers, they did not recognize that the methods they disclosed resulted in the formation of products containing toxic reaction by-products or that the use of liquid urea/sulfuric acid reaction products having $H_2SO_4$/urea molar ratios in excess of about 0.7 dramatically reduces or completely eliminates urea volatilization loss associated with topical application of urea on relatively alkaline soils. Those investigators did not appreciate that the incipient decomposition temperature—the temperature at which reactant and/or product decomposition commences—varies with reactant and product composition, or the effect that decomposition has on product composition.

It is therefore one object of this invention to provide improved urea-containing topical fertilizer compositions.

It is another object of this invention to provide improved urea/sulfuric acid reaction product compositions, which when applied to the soil, even in dilute form, dramatically reduce urea volatilization loss.

It is another object of this invention to provide improved topical fertilization methods employing solutions of urea-sulfuric acid reaction products.

Yet another object of this invention is to provide methods for applying urea solutions to the soil surface and minimizing or preventing the loss of nitrogen fertilizer values by volatilization loss.

Other objects, aspects, and advantages of this invention will be apparent to one skilled in the art in view of the following disclosure, the drawings, and the appended claims:

SUMMARY OF THE INVENTION

This invention relates to liquid fertilizer solutions comprising urea-sulfuric acid reaction products particularly suited for topical application to the soil, and to methods of topically fertilizing soils, particularly alkaline soils, with such compositions. The use of these solutions for topical fertilization markedly reduces the loss of urea nitrogen by urea volatilization and improves crop fertilization control.

Subsurface urea application usually does not occasion significant loss of nitrogen fertilizer values by urea volatilization, due to the fact that urea decomposition products are adsorbed or otherwise fixed in the soil; thus, they remain available for plant nutrition. However, topical application is often preferred since it is simpler than subsurface application and eliminates the need for injectors or other devices capable of introducing urea below the soil surface.

Urea volatilization can occur in soils in which the water in equilibrium with the soil has a pH above about 5. At pH levels of about 5, nitrogen loss is not very significant, however, the rate of nitrogen loss increases dramatically with pH. Thus, the nitrogen loss resulting from urea volatilization with topically applied urea in soils having a pH of about 8 is approximately twice that that occurs in the same period of time in soils having a pH of about 6. The nitrogen loss in very alkaline soils having pH values of about 10 is approximately 100 times that that occurs at pH 6.

Most soils in the western United States have pH levels above 7.5 or 8. The topical application of urea on those soils often results in the loss of 25 to 30 percent of the nitrogen fertilizing value of the applied urea and, under extreme conditions, can result in the loss of essentially all of the urea applied topically. The more extreme cases involve more alkaline soils having pH levels above about 8 and relatively high ambient temperatures.

In accordance with one embodiment of this invention, unique liquid fertilizer solutions particularly adapted to topical fertilization comprise urea-sulfuric acid reaction products having $H_2SO_4$/urea molar ratios of at least about 0.7 that are essentially free of undesirable by-products normally associated with urea-sulfuric acid reaction products such as ammonium sulfamate and/or sulfamic acid.

In accordance with another embodiment of this invention, agricultural soils are topically fertilized with urea-containing fertilizer solutions comprising urea-sulfuric acid reaction products having $H_2SO_4$/urea molar ratios of at least about 0.7.

BRIEF DESCRIPTION OF THE DRAWINGS

The invention will be more readily understood by reference to the drawings of which.

DETAILED DESCRIPTION OF THE INVENTION

Figure 1:
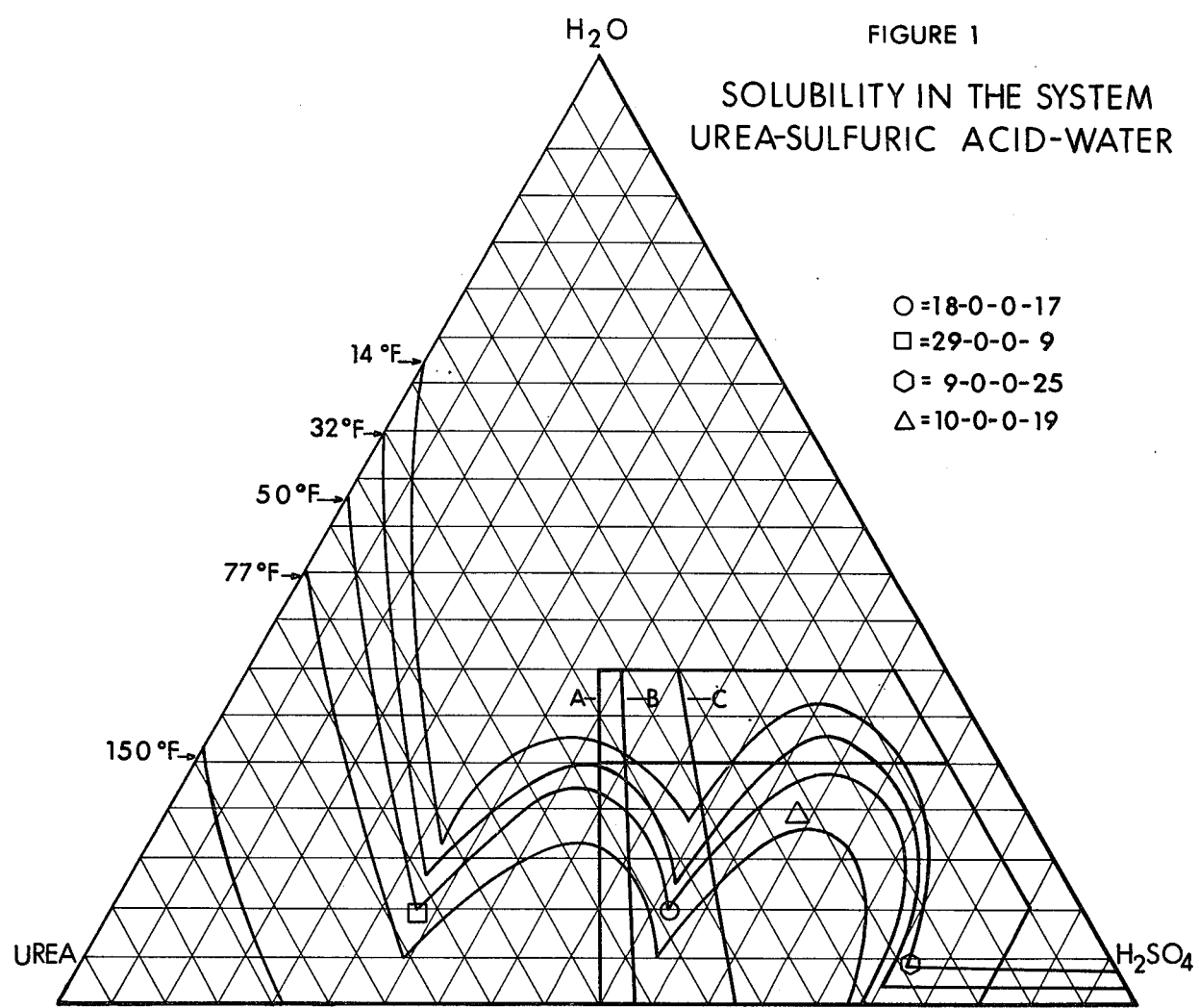
FIG. 1 is a ternary phase diagram for the urea, sulfuric acid, and water system illustrating isotherms at several different temperatures, the existence of three prominent eutectics along those isotherms and the urea-sulfuric reaction products useful in the fertilizer compositions and methods of this invention.

The topical fertilizer compositions of this invention are clear, homogeneous aqueous solutions containing a fertilizing effective amount of a urea-sulfuric acid reaction product hereinafter defined. The fertilizer solutions usually contain at least about 10 weight percent, generally 10 to about 100 weight percent, and preferably at least about 50 weight percent of the urea-sulfuric acid reaction product. Use of the reaction products without dilution is particularly preferred in many instances to minimize the volume of material that must be delivered. However, the concentrates are relatively viscous at ambient temperatures and their use without dilution requires application equipment capable of handling such viscous solutions. Thus, the dilute solutions of lower viscosity are sometimes preferred in order to obtain more even distribution with available equipment.

The urea-sulfuric acid reaction product concentrates are also clear homogeneous solutions containing the reaction products of urea, sulfuric acid, and, optionally, water. Water may be present in very minor amounts or may be omitted entirely in some compositions as illustrated in the ternary phase diagram of FIG. 1. The reaction products contain about 35 to about 85 weight percent, preferably about 40 to about 80 weight percent, sulfuric acid; about 5 to about 47 weight percent, preferably about 25 to about 38 weight percent, urea; and 0 to about 35 weight percent, preferably less than about 25, and more preferably less than about 15 weight percent, water. Urea and sulfuric acid, in combination, account for at least 65 weight percent, preferably at least about 75 weight percent, and most preferably at least about 85 weight percent of the reaction products. The relative proportions of urea and sulfuric acid in the reaction products are such that the $H_2SO_4$/urea molar ratio is at least about 0.7, preferably at least about 1.

The reaction products and fertilizer compositions are essentially free of toxic by-products normally associated with urea-sulfuric acid reaction products such as sulfamic acid and/or ammonium sulfamate, and are preferably completely free of such impurities. The reaction products usually have crystallization temperatures of about 80° F. or less, preferably about 50° F. or less, to avoid precipitation during storage and shipment. Although more concentrated solutions having higher crystallization temperatures can be employed in the manufacture of the fertilizer compositions of this invention, since the crystallization temperature can be reduced by dilution to produce the fertilizer composition, the lower crystallization temperature formulations are presently preferred for the reasons discussed above.

The four-digit designation for the reaction products used herein, e.g., 18-0-0-17, are conventionally used in the agricultural industry to designate the concentration of nitrogen, phosphorus (as $P_2O_5$), potassium (as $K_2O$), and a fourth component —in this case sulfur expressed as the element. Thus, the composition 18-0-0-17 contains 18 weight percent nitrogen derived from urea and 17 weight percent sulfur derived from sulfuric acid. Using the atomic weights for nitrogen (14) and sulfur

(32) and the molecular formulas and molecular weights for urea (60.06) and sulfuric acid (98.08), it can be readily determined that this formulation contains 38.6 weight percent urea and 52.1 weight percent sulfuric acid. By difference, the solution contains 9.3 weight percent water. The composition of all other products and feed solutions can be determined by the same procedure.

The composition and some of the physical properties of the urea-sulfuric acid reaction products are illustrated by the ternary phase diagram of FIG. 1. The phase diagram defines the relative proportions in weight percent for each of the three components—urea, sulfuric acid, and water—at any point within the diagram. At each apex of the triangle the system consists completely of the indicated component. Thus, the urea concentration at the urea apex is 100 percent and diminishes linearly to 0 along a straight line from the urea apex to the midpoint of the $H_2O$-$H_2SO_4$ boundary line, i.e., the side of the triangle opposite the urea apex. The same is true of the remaining two components: water and sulfuric acid.

The diagram also illustrates the isotherms for the system at 14° F., 32° F., 50° F., 77° F., and 150° F. The 150° F. isotherm is illustrated only partially at the lower left-hand portion of the diagram. Each isotherm defines compositions which, if cooled below the temperature indicated for the respective isotherm, will precipitate components of the system. However, the solutions will super-cool dramatically, e.g., by as much as 50° F., or more, under quiescent conditions in the absence of seed crystals, impurities, etc., that promote crystallization.

As indicated by the pattern of the isotherms, systems having a fixed ratio of urea to sulfuric acid become more stable at lower temperatures as the water concentration is increased. This is true throughout most of the phase diagram with the exception of the region in the vicinity of the higher acid eutectic in the lower right-hand portion of the phase diagram.

Three prominent eutectics are apparent within the region of the illustrated isotherms. Each eutectic represents a discontinuity in the response of the system, e.g., of crystallization point, to changes in solute concentration, and indicates the points of maximum solute concentration for a given isotherm in the regions of the phase diagram associated with those eutectics.

As indicated in the legend on FIG. 1, the left-hand eutectic on the 50° F. isotherm corresponds to the formulation 29-0-0-9. The middle eutectic on the same isotherm corresponds to the composition 18-0-0-17. The right-hand eutectic on the 14° F. isotherm corresponds to the formulation 9-0-0-25, and the formulation intermediate the 50° F. and the 77° F. isotherms between the middle and right-hand eutectics indicated by a triangular designation corresponds to the formulation 10-0-0-19.

The 29-0-0-9 eutectic and, for that matter, all formulations to the left of line B on the ternary phase diagram are not encompassed by the definition of reaction products within the scope of this invention, since they do not significantly reduce or completely eliminate nitrogen loss by volatilization, particularly when applied to relatively alkaline soils, which is a principal objective of this invention.

The bold lines within the diagram generally define the boundaries for formulations for which the methods of this invention are uniquely suited. Bold lines parallel to one side of the trilinear diagram define a fixed concentration of the solute designated at the apex of the triangle opposite the side to which that line is parallel. Thus, the higher horizontal line in FIG. 1 borders the area of formulations containing 35 percent water or less and varying amounts of urea and sulfuric acid. The area below the lower horizontal line defines formulations containing 25 weight percent water or less.

Vertical line A in the center of the diagram intersecting the urea-sulfuric acid line at the half-way point defines compositions having a one-to-one weight ratio of sulfuric acid to urea and an $H_2SO_4$/urea molar ratio of 0.61. If extended vertically, line A would intersect the water apex. Line B on the phase diagram represents reaction products having $H_2SO_4$/urea molar ratios of 0.7 and weight ratios of 1.143. It intersects the urea-sulfuric acid boundary at the point corresponding to 46.66 weight percent urea and 53.34 weight percent sulfuric acid and, if extended, would pass through the water apex of the diagram. All formulations to the right of Line B have $H_2SO_4$/urea molar ratios of about 0.7 or greater.

Line C intersects the urea-sulfuric acid boundary at the point corresponding to 37.98 weight percent urea and 62.02 weight percent sulfuric acid and represents reaction products having $H_2SO_4$/urea molar ratios of 1 and weight ratios of 1.633. If extended upwardly, Line C would also intersect the water apex. All formulations to the right of Line C on the phase diagram have $H_2SO_4$/urea molar ratios of 1 or greater.

The urea-sulfuric acid reaction products useful in the compositions of this invention can be produced by either batch or continuous processes as described in my copending applications Ser. No. 318,343, filed Nov. 5, 1981, and Ser. No. 318,629, filed Nov. 5, 1981, both of which are incorporated herein by reference. Those processes can be used to accurately and consistently produce urea-sulfuric acid reaction products of predetermined composition and crystallization temperature essentially or completely free of decomposition products such as sulfamic acid and/or ammonium sulfamate. Generally the reaction products can be produced by separately and simultaneously feeding urea, sulfuric acid and, optionally, water as required into a reacting liquid phase contained in a reaction zone in proportions corresponding to the relative proportion of each respective component in a predetermined product composition within the ranges discussed above. The urea and sulfuric acid react within the reaction zone under controlled conditions in which reaction temperature is always maintained at a point below about 176° F. and below the incipient decomposition temperature of the predetermined product.

Even minor decomposition of the reactants and/or product during manufacture or otherwise results in the formation of known toxic materials including ammonium sulfamate and sulfamic acid. Thus, adequate temperature control is imperative to prevent decomposition which, once commenced in a large volume of inadequately cooled material, can lead to very rapid temperature escalation, e.g., up to 600° F. and higher, and to the literal explosion of the reactor and associated processing facility.

The magnitude of the reaction exotherm and incipient decomposition temperature variations are illustrated in the following table:

| Composition | Incipient Decomposition Temperature | Heat of Reaction BTU's per Ton |
|---|---|---|
| 29-0-0-9 | 158° F. | 73,600 |
| 18-0-0-17 | 176° F. | 173,400 |
| 9-0-0-25 | 176° F. | 149,500 |
| 10-0-0-19 | 176° F. | 195,500 |

The heats of reaction reported in the foregoing table and elsewhere herein were determined calorimetrically using the reaction of prilled urea with 98 percent sulfuric acid and the amount of water required for the designated formulation.

Incipient decomposition temperatures can be determined by very gradually increasing the temperature of a solution of the designated composition until gas evolution is first observed. The incipient decomposition temperature of any formulation can be determined by this procedure.

The evolved gas comprises carbon dioxide and, in the absence of unreacted sulfuric acid, may also comprise ammonia. In the presence of unreacted sulfuric acid, a condition that exists in the reaction zone, the ammonia would react very exothermically with sulfuric acid to increase solution temperature and heat load at a rate even faster than that occasioned by the sulfuric acid-urea reaction. This mechanism may be partially responsible for the observed autocatalytic decomposition of these solutions at elevated temperature.

As a general rule, incipient decomposition temperatures of the reaction products useful herein range from about 165° F. to about 176° F. with the higher decomposition temperatures being associated with products having higher acid-to-urea ratios.

Gross system temperature is not an adequate indication of incipient decomposition at localized points within a relatively large volume of solution, e.g., in a commercial reactor. For instance, the direct addition of concentrated sulfuric acid to a large volume of urea as described in U.S. Pat. No. 4,116,664 referred to above, will invariably result in localized overheating and temperatures in excess of incipient decomposition temperatures even though the average temperature for the bulk of urea may be somewhat lower. This was confirmed by the fact that samples of materials produced in the process described in that patent were found to contain as much as 5 to 6 weight percent of the decomposition products ammonium sulfamate and/or sulfamic acid.

The process can be batch or continuous, although the continuous method is preferred for several reasons. Continuous processing improves process stability and the control of composition, reaction temperature, crystallization point and corrosivity. All of these factors are important for different reasons.

Accurate control of reaction phase composition is closely related to temperature control due to the highly exothermic nature of the sulfuric acid-urea reaction. It is also closely related to crystallization point and corrosivity; minor variations in product composition can significantly affect both properties. Significant variation in crystallization point can result in solids formation or complete "setting up" of the product in lower temperature treating, storage or application facilities. Increased corrosivity occasioned by composition changes can dramatically increase the corrosion of the reactor and processing facilities, particularly at elevated processing temperatures.

These several characteristics can be controlled by gradually and simultaneously adding urea, concentrated sulfuric acid and water to the reaction zone at relative rates corresponding to the concentration of each component in a predetermined product and cooling the resultant reacting liquid phase sufficiently to maintain it at a temperature below its incipient decomposition temperature and below 176° F., at all times. As pointed out above, bulk system temperature may not accurately indicate the presence or absence of localized overheating unless the reacting liquid phase is adequately agitated and thoroughly mixed during the course of the reaction.

Although the reaction will proceed at relatively low temperatures, it becomes too slow to be economically desirable at temperatures much below 120° F. Accordingly, the reaction is usually run at temperatures of at least 120° F., generally about 130° F. to 176° F., preferably below about 160° F., and most preferably about 150° F. or less. The lower temperatures, e.g., of about 150° F.–160° F., or less, are particularly preferred.

The feed rates of all three components, and the composition of the reacting liquid phase, should be maintained as closely as possible to the stoichiometric proportion of each respective component in the predetermined product. Thus, the concentration of each component should be maintained within about 2 percent, preferably within 1 percent or less, of its stoichiometric value in the product.

In the preferred method in which a portion of the reaction phase is removed from the reaction zone and cooled by direct air contact heat exchange, some water is lost from the system and must be made up by increasing the water feed to the reaction zone by an amount proportional to the rate of water loss in the cooler.

The close tolerances of reactant composition and temperature will generally allow control of product crystallization temperature within 10° F., preferably within 5° F. or less, of the desired crystallization temperature.

Although the considerable heat of reaction theoretically can be dissipated by essentially any cooling means, such as cooling coils within the reactor, heat dissipation and temperature control are facilitated by assuring that the reaction zone into which the urea-sulfuric acid and water are introduced, contains an amount of a mixture of reactants and reaction product corresponding to at least about 0.1, preferably at least about 0.2 times the hourly feed rate in batch systems, and at least about 0.5, usually at least about 1, and preferably at least about 2 times the hourly feed rate in the preferred continuous process. Although somewhat lower reactor volumes would be adequate to control temperature in the continuous process in some cases, they would not be adequate to assure complete reaction of the customary forms of urea feeds, i.e., prills and/or pellets. Longer holding times and thus larger reactor inventories relative to product withdrawal rate and reactant feed rate are preferred in the continuous process to assure that the withdrawn product does not contain unreacted urea.

The minimum reactor volume required to prevent the discharge of unreacted urea during continuous operation can be defined by the following expression which is unique to this reactor system:

$$V_o = u/k(14.3\ d^2 - 1)$$

where k is the first order rate constant in reciprocal minutes, d is the diameter of the largest urea particles in millimeters, $V_o$ is the volume of the liquid phase within the reaction zone in gallons, and u is the production rate from the reaction zone in gallons per minute. From this relationship, it can be seen that theoretically very small reactor volumes could be used with very small diameter urea feeds, e.g., urea dust. As a practical matter, however, minimum volumes of about one-half hourly production are required to provide sufficient inventory for adequate cooling to prevent incipient decomposition and for more effective process control.

The first order rate constant can be determined from the expression unique to this system:

$$k = 1/t(\ln d^2 + 2.659)$$

where t is the time in minutes required for dissolution of the type of urea feed, e.g., prills, pellets, granules, etc.

The dissolution rate varies with urea type, e.g., prilled urea or pelleted urea. Prilled urea is usually less dense and somewhat more porous than is pelleted urea, and is produced by forming droplets of molten urea in a prilling tower of sufficient height to allow the urea droplets to solidify during their descent. Pelleted ureas are usually produced by spraying molten urea onto urea "seeds" or dust in granulating apparatus such as pan or drum granulators.

The reaction rate constant can be determined experimentally for any given product composition and urea feed type by determining the rate at which the urea particle dissolves in the given formulation.

The reaction rate is first order and varies markedly with temperature. Experimentally observed values for the rate constant for 18-0-0-17 and 10-0-0-19, and the effect of temperature on the rate constant for each respective product using prilled urea and granular urea, are graphically illustrated in FIGS. 2 and 3, respectively.

The rate of urea dissolution can be determined by any one of several means. The data illustrated in FIGS. 2 and 3 were obtained by suspending several urea prills or granules of known diameter in the selected solution at a predetermined temperature by mild agitation. The elapsed time required for the urea particle to dissolve and disappear was determined by visual observation and was taken as the value of t for that combination of urea type and product solution. As discussed above, particle diameter is taken as the diameter of the largest urea particles in the feed. The largest particles in most prilled ureas have diameters of at least about 1 millimeter, usually about 2 millimeters. Granular ureas may be somewhat larger.

Knowing the value of k, the minimum reactor volume required for continuously producing any product at a given temperature can be determined from the expression for $V_o$. The same procedure can be used to determine the value of t, and thus the values of k and $V_o$ for any combination of urea type and reactant phase composition.

Figure 2:
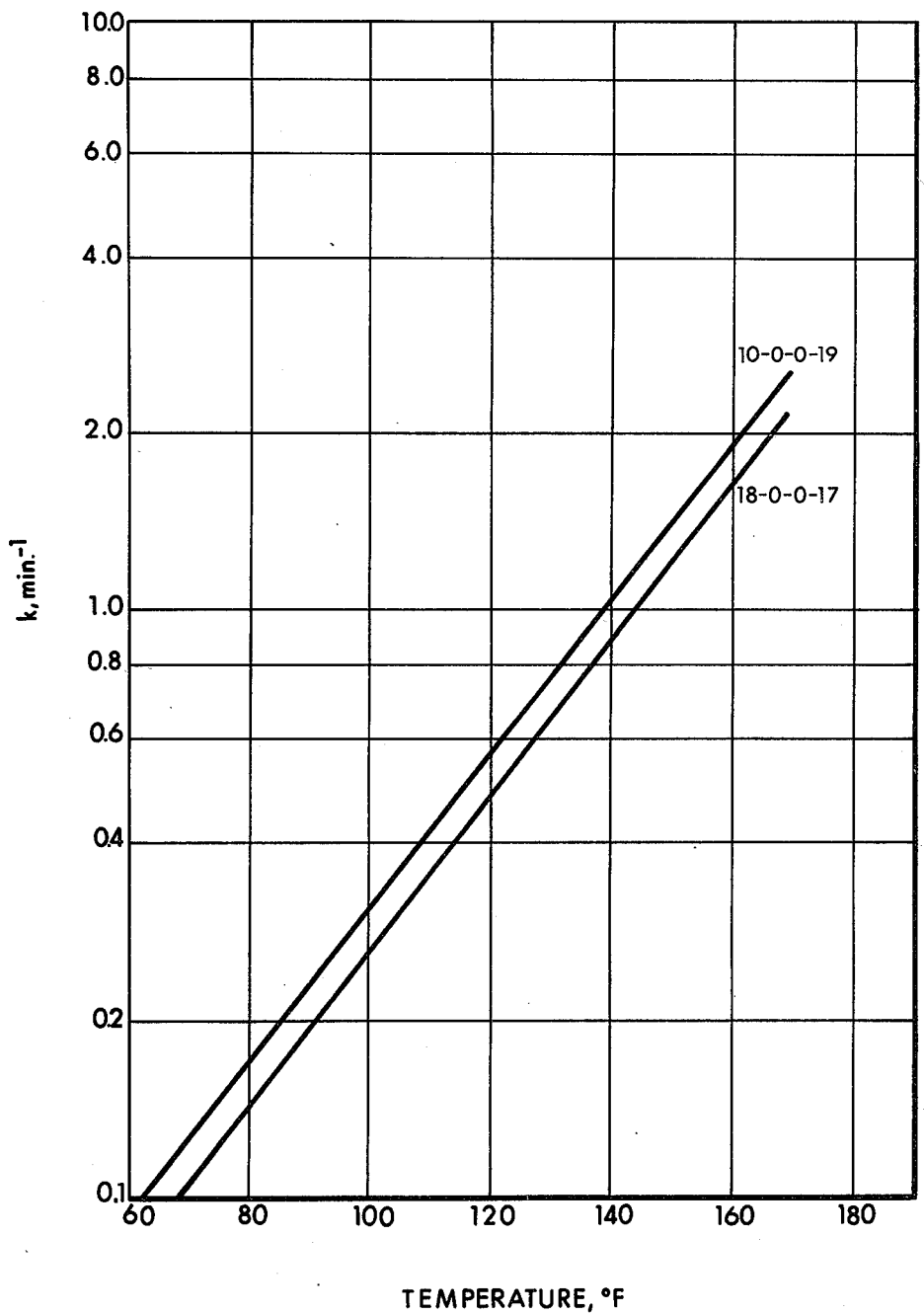
FIG. 2 is a correlation of the reaction rate constant versus temperature for the two designated urea-sulfuric acid reaction products using prilled urea feeds.
Figure 3:
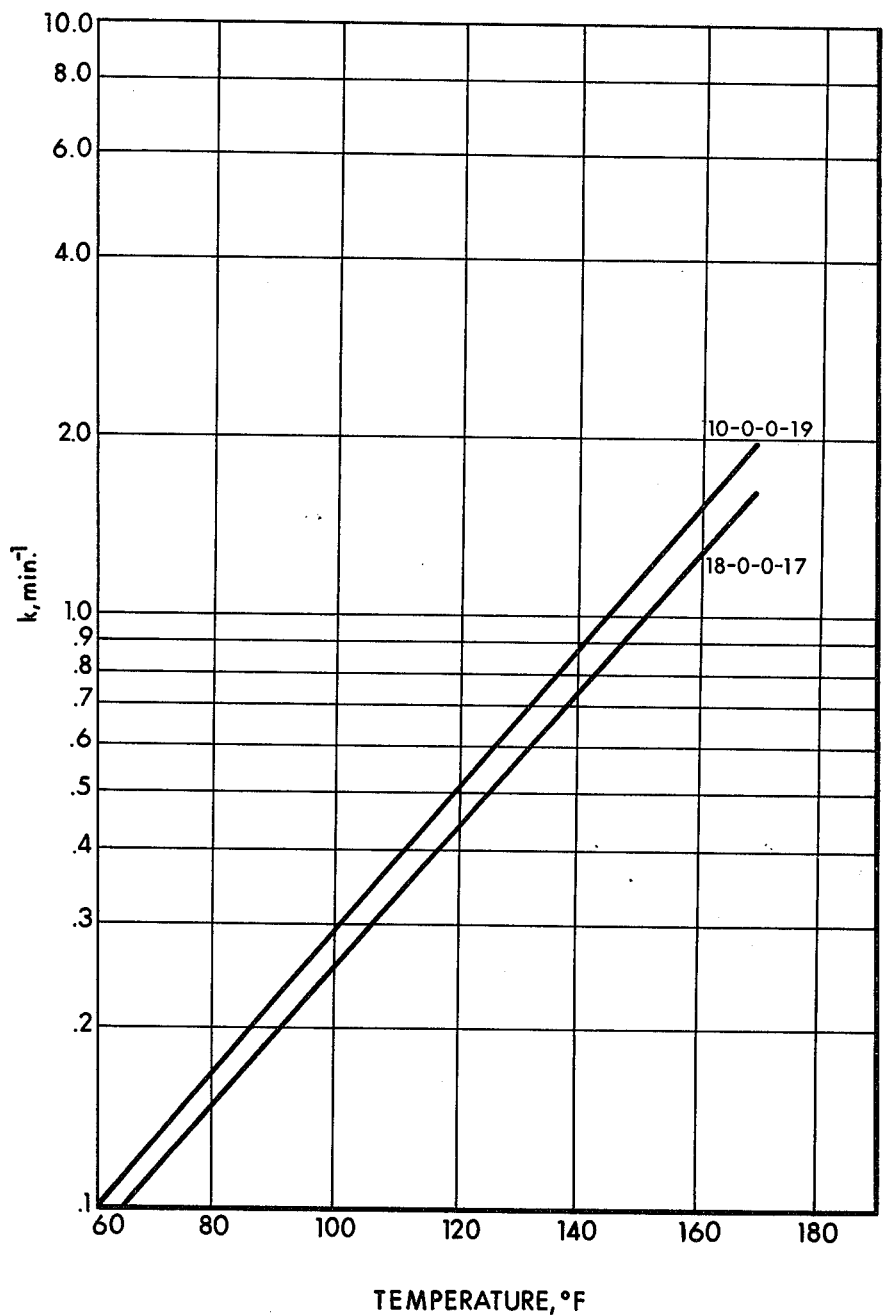
FIG. 3 is a correlation of the reaction rate constant with temperature for the two designated urea-sulfuric acid reaction products using granular urea feed.

As can be seen from FIGS. 2 and 3, the reaction rate constant k diminishes markedly with temperature. Thus, from the relationship between $V_o$ and reaction constant discussed above, it can be seen that larger reactor volumes are required to obtain the same production rate of the same product at lower reaction temperatures.

Adequate control of the factors discussed above, particularly heat load, solution temperature, composition, crystallization point and corrosivity, is particularly important in industrial scale reactors of relatively large volume in which the excess heat associated with decomposition cannot be rapidly dissipated. Most commercial systems will have reaction zone volumes of at least about 50 gallons, usually at least about 100 gallons, and most often in excess of 500 gallons. The reaction phase is relatively viscous even at reaction temperatures, and that factor, combined with the relatively low heat capacity of these compositions, makes adequate temperature control and rapid heat exchange even more difficult in the large volumes associated with commercial production.

Figure 4:
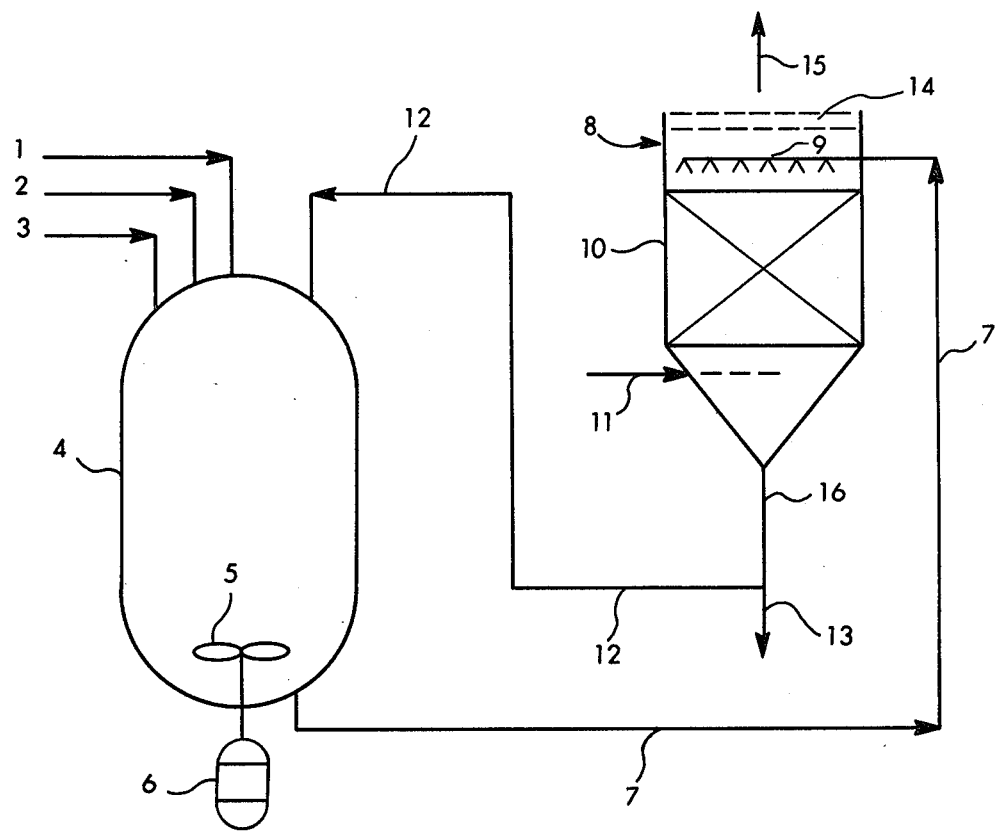
FIG. 4 is a schematic illustration of an apparatus and process system suitable for use in the manufacture of the urea-sulfuric reaction products described herein.

The process can be better understood by reference to FIG. 4 which is a schematic illustration of the continuous method employing countercurrent direct air heat exchange. Solid urea, water and sulfuric acid are simultaneously and continuously added through pipes 1, 2, and 3 to reactor 4 provided with agitating means, such as impeller 5 driven by motor 6 or other means. The reacting liquid phase is continuously passed from reactor 4 through pipe 7 to spray nozzles 9 in the direct air heat exchanger 8. Ambient air or cooled air is introduced to the lower portion of the heat exchanger through pipe 11 or other means, and passes upwardly through packed section 10 into direct contact with downward flowing liquid phase. Following contact with the acid, the warmed air passes through demister section 14 and can be emitted directly to the atmosphere. Even at elevated temperatures very little sulfate is present in the effluent air. Cooled product is removed from heat exchanger 8 through pipe 16 and is either passed to storage via pipe 13 or is returned as cooling medium to reactor 4 by pipe 12.

Urea can be fed in any available form, such as prills, granules, powder and the like. The minor variations in the purity of commercial ureas can be sufficient to significantly affect process conditions, even though that variation ranges only from about 46 to about 46.6 weight percent nitrogen. The urea feed is preferably periodically analyzed for nitrogen content and its feed rate adjusted accordingly in view of the stoichiometry of the desired product.

The sulfuric acid feed can be concentrated sulfuric acid, usually 92 to 98 weight percent $H_2SO_4$, or it can be diluted with water before introduction into the reaction zone although the amount of water cannot exceed that allowable in the predetermined product. Fuming sulfuric acid can also be used. Essentially any acid source is suitable. Spent alkylation acid can also be used in this process. Concentrated sulfuric acid is presently preferred due to commercial availability, and the markedly higher corrosivity of more dilute acid solutions.

If dilute acid feeds are employed, the amount of water added with the acid feed should not exceed the amount permitted in the product. This amount varies substantially from product to product. For instance, the minimum acid concentration that can be employed in the manufacture of 18-0-0-17 is 85 weight percent $H_2SO_4$. Somewhat lower acid concentrations can be used in the manufacture of other products, e.g., 74.2 weight percent $H_2SO_4$ for 10-0-0-19. The use of more dilute acids will result in the addition of excess water to the reaction zone which will result in the formation of an off-specification product unless the excess water is somehow removed in the process.

Once the continuous process is commenced, it can be run indefinitely provided that sufficient provision is made to control corrosion and that changes in product composition are not required.

In starting up either a batch or continuous process, a product inventory can be manufactured in the reaction vessel by gradual addition of the reactants in stoichiometric proportions, provided that sufficient cooling is available to maintain the reacting mixture at a temperature below the incipient decomposition temperature. In the alternative, an inventory of material produced in a previous operation can be used. In either event, the initial inventory, or heel, must be of the same composition as that of the desired product so that deviations in composition, crystallization point, heat of reaction or corrosivity do not occur during the process.

During start-up, the initial inventory may be of lesser volume than that ultimately maintained in the reaction zone to assure complete reaction. The initial heel enables more adequate control of reaction temperature developed by the exothermic reaction during start-up.

The heat of reaction involved in the formation of any product can be determined calorimetrically by reacting the selected urea and sulfuric acid feeds and water (when required by the formulation) under closely controlled temperature conditions sufficient to prevent incipient decomposition. The heat of reaction for a given product can then be used to calculate the total heat load on a given system, and thus the cooling capacity required for a given production rate. In the alternative, the heat of reaction can be calculated from the following expressions:

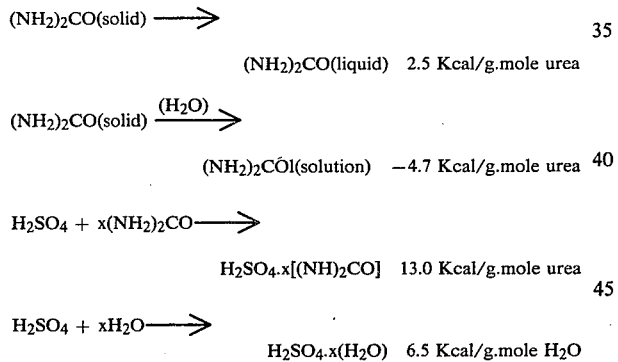

The overall reaction is illustrated by the equation:

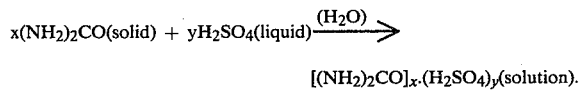

Applying these expressions to the amount of solid urea and sulfuric acid added to the reaction zone will yield the amount of heat to be expected in the reaction. That value, reaction temperature, and product specific heat allow the determination of production rates permissible in any system assuming the process is limited by cooling capacity, or conversely, the cooling capacity that must be provided for the production of that product at a given rate. Specific heat can be determined by standard calorimetric procedures and ranges from about 0.35 to about 0.5.

As discussed above, reaction temperature must be maintained below permissible maximums and is preferably maintained above certain minimums so that the practical operating range is relatively narrow. Even minor changes in process conditions can result in temperature excursions beyond these ranges.

The high viscosity, low specific heat, low maximum allowable temperature, high corrosivity to conventional alloys at high fluid velocity, and low water content of these products, place severe limitations on conventional heat exchangers. Nevertheless, conventional designs such as shell and tube, coil, etc., can be used, although they must be designed in view of the product characteristics mentioned above.

The reacting liquid phase can be adequately cooled by direct contact countercurrent heat exchange with ambient air making use of a relatively simple cooling unit design such as that illustrated in FIG. 4. This approach mitigates the problems associated with the high corrosivity, high viscosity and low specific heat of these compositions. The direct air heat exchange method adequately cools the reacting liquid phase even though it has very low vaporizable water content, and does so without introducing or removing uncontrollable amounts of water to or from the reaction phase or polluting the atmosphere.

The contact section of the cooler illustrated in FIG. 4 can consist of any corrosion and heat resistant shell, e.g., stainless steel, and an adequate quantity of acid-resistant packing of any one of numerous types. Acceptable packing materials include plastic or ceramic saddles and the like.

The design of the direct contact exchanger for any particular operation should be based upon the highest heat load anticipated which is a function of product composition and production rate, and can be established by testing different combinations of packing material, packing section design, product flow rate and air flow rate through the exchanger.

As a practical matter, the packing section should have height to diameter ratio of at least about 1 and, for most packing materials, should be operated at liquid flow rates of about 25 to about 200 pounds per hour per cubic foot of packing and air flow rates of about 25 to about 100 cubic feet per minute per cubic foot of packing material. Significantly higher liquid flow rates should be avoided to avoid flooding the cooler while higher air flow rates should be avoided to prevent excessive resistance to downward liquid flow and product carryover into the demister section.

Continuous monitoring and compensation for water removal from the system is preferred and is necessary for precise control of composition, temperature, and corrosion. This can be achieved by monitoring product or reactor phase composition or water removal rate in the cooler and adding water as required to the reaction zone.

Even small variations in sulfuric acid feed concentration or minor excursions in product composition, can produce sharp changes in the water removal rate in the direct air heat exchanger. This occurrence has a feedback effect on the overall process which alters reaction temperature and cooler efficiency and can result in unacceptable swings in product and reactant phase composition. This problem can be mitigated by monitoring the rate of water removal from the system and by precise control of product composition.

Product composition can be determined by periodically sampling the product effluent and analyzing for sulfuric acid, urea and water and gradually modifying reactant feed rates as necessary to maintain specification product composition. Acid content can be determined by standard acid titration techniques, and both acid and urea concentrations can be determined by mass spectrographic analysis, high precision infrared or liquid chromatographic analysis, or by standard wet chemical test procedures for urea and sulfuric acid. Having determined sulfuric acid and urea concentration, water can be determined by difference. Product composition is also reflected by specific gravity and refractive index. Thus, one or both of these tests can be used in combination with total acidity to determine urea and the sulfuric acid concentration while water, again, can be determined by difference.

The fertilizer compositions, i.e., the concentrated or dilute reaction product with or without other micro or macro nutrients or soil adjuvants, are topically applied in effective fertilizing amounts usually corresponding to at least about 40 pounds, preferably at least about 60 pounds of reaction product per acre. Dosages usually employed to obtain significant nitrogen fertilization correspond to at least about 40, sometimes at least about 80 and generally about 40 to about 300, pounds of nitrogen per acre.

The superiority of these fertilizer compositions as compared to alternative formulations is more significant in relatively alkaline soils. Thus, these compositions are particularly suitable for topical application to soils having pH levels of at least about 5, usually at least about 6, preferably at least about 7.5, and most often between about 7.5 and about 10. As discussed above, nitrogen loss from topical urea application increases dramatically with soil pH and these compositions substantially reduce or completely eliminate such loss. Soil pH can be determined by the procedure described in U.S. Department of Agriculture Handbook No. 10, published in February, 1954. Briefly, that procedure involves mixing sufficient water with a soil sample to thoroughly wet the soil and measuring the pH of the aqueous phase with a standard pH meter.

The relative advantages of these fertilizer compositions have been demonstrated by both field trials and lysimeter studies. These tests confirmed that the use of these compositions is superior to separate applications of urea and sulfuric acid and to urea-sulfuric acid reaction products having $H_2SO_4$/urea molar ratios below 0.7, e.g., 29-0-0-9. Those tests also established that the reduction in nitrogen loss associated with these compositions persists beyond the point that the acid component of the compositions would be neutralized by alkaline soil.

The extent of nitrogen loss can be readily determined by analyzing the soil for nitrogen by conventional techniques before and after application. Samples can be obtained and analyzed 24 hours, 48 hours, or longer after application, and should represent the total soil regime effected by the application. Thus, if the treated area is extensively irrigated, representative samples should be taken to the depth affected by irrigation water penetration.

EXAMPLE 1

A sample of calcareous agricultural soil having a pH of 8.6 was placed in a standard laboratory lysimeter and topically treated with undiluted 29-0-0-9 having an $H_2SO_4$/urea mole ratio of 0.27, at a rate corresponding to 200 lbs. of nitrogen per acre.

The lysimeter and soil sample were maintained at a temperature of about 70° F. and were continually swept with humidified air which was then passed through a standard sulfuric acid trap to capture any ammonia evolved from the soil sample. After three days of operation the contents of the acid trap were analyzed and were found to contain an amount of nitrogen corresponding to 5.5 percent of the total nitrogen applied to the soil sample. This finding corresponds to a nitrogen loss of 5.5 percent within three days under relatively mild ambient conditions.

EXAMPLE 2

The lysimeter test of Example 1 was repeated using undiluted 18-0-0-17 having an $H_2SO_4$/urea mole ratio of 0.83 applied to a sample of the same agricultural soil at a rate corresponding to 200 lbs. of nitrogen per acre. After three days of operation no ammonia had been trapped in the sulfuric acid trap indicating that there had been no nitrogen loss from the soil. The nitrogen detection limit of this test was 0.1 percent of the total nitrogen applied to the soil sample.

EXAMPLE 3

The operation of Example 1 was repeated using undiluted 10-0-0-18 having an $H_2SO_4$/urea mole ratio of 1.56 applied at a rate corresponding to 200 lbs. of nitrogen per acre. After three days of operation no nitrogen was detected in the sulfuric acid trap indicating that no urea volatilization loss had occurred in the soil sample.

Numerous variations and modifications of the concepts of this invention will be apparent to one skilled in the art in view of the aforegoing disclosure, drawings, and the appended claims, and are intended to be encompassed within the scope of this invention as defined by the following claims.

I claim:

1. A method for fertilizing soil with urea which comprises the step of topically applying to the surface of said soil a fertilizing effective amount of a composition comprising a urea-sulfuric acid reaction product containing about 35 to about 85 weight percent sulfuric acid, about 5 to about 47 weight percent urea, and about 0 to about 35 weight percent water, in which said urea and sulfuric acid constitute at least about 65 weight percent of said reaction product and said reaction product has an $H_2SO_4$/urea molar ratio of at least about 0.7.

2. The method defined in claim 1 wherein said reaction product and said composition contain no detectable amount of a member selected from the group consisting of sulfamic acid, ammonium sulfamate, and combinations thereof.

3. The method defined in claim 1 wherein said composition is applied to the surface of said soil at a rate equivalent to at least about 40 pounds of said reaction product per acre and said composition comprises a solution of about 10 to about 100 weight percent of said reaction product in water.

4. The method defined in claim 3 wherein said reaction product and said composition contain no detectable amount of a material selected from the group consisting of sulfamic acid, ammonium sulfamate, and combinations thereof, and said soil is an alkaline soil having a pH of at least about 7.5.

5. The method defined in claim 1 wherein said reaction product comprises about 25 to about 38 weight percent urea, about 40 to about 80 weight percent sulfuric acid, has an $H_2SO_4$/urea molar ratio of at least about 1, and contains no detectable amount of a member selected from the group consisting of sulfamic acid, ammonium sulfamate, and combinations thereof.

6. The method defined in claim 1 wherein said urea and sulfuric acid constitute at least about 75 weight percent of said reaction product and said composition comprises about 50 to about 100 weight percent of said reaction product.

7. The method defined in claim 1 wherein said reaction product is produced by the method including the steps of introducing concentrated sulfuric acid, solid urea, and water separately and simultaneously into a reaction zone in proportions corresponding to about 35 to about 85 weight percent sulfuric acid, about 5 to about 47 weight percent urea, and 0 to about 35 weight percent water, wherein said urea and sulfuric acid, taken in combination, constitute at least about 65 weight percent of the feed to said reaction zone, the $H_2SO_4$/urea molar ratio of said feed to said reaction zone is at least about 0.7, and said feeds are reacted in said reaction zone at a temperature below about 176° F. and below the incipient decomposition temperature of said reaction product to produce said reaction product containing no detectable amount of a member selected from the group consisting of sulfamic acid, ammonium sulfamate, and combinations thereof.

8. The method defined in claim 1 wherein said soil is an alkaline soil having a pH of at least about 6.

9. The method defined in claim 1 wherein said urea is present in said composition as a member selected from the group consisting of monourea sulfate, diurea sulfate, and combinations thereof.

10. A method for fertilizing soil, which method comprises topically applying to the surface of said soil a fertilizing effective amount of a composition comprising a urea-sulfuric acid reaction product containing about 35 to about 85 weight percent sulfuric acid, about 5 to about 47 weight percent urea, and 0 to about 35 weight percent water, in which said urea and sulfuric acid, in combination, constitute at least about 65 weight percent of said reaction product, said reaction product has an $H_2SO_4$/urea molar ratio of at least about 0.7, and said composition is free of urea-sulfuric acid reaction by-products resulting from the decomposition of a member selected from the group consisting of urea, sulfuric acid, and combinations thereof.

11. The method defined in claim 10 wherein said composition contains no detectable amount of a member selected from the group consisting of ammonium sulfamate, sulfamic acid, and combinations thereof.

12. The method defined in claim 11 wherein said composition consists essentially of said reaction product.

13. The method defined in claim 10 wherein said composition is an aqueous solution of said urea-sulfuric acid reaction product, which solution comprises about 10 to about 100 weight percent of said reaction product.

14. The method defined in claim 10 wherein said soil is an alkaline soil having a pH of at least about 7.5.

15. The method defined in claim 10 wherein said $H_2SO_4$/urea molar ratio is at least about 1.

16. A method for topically fertilizing alkaline soil with urea and for inhibiting the volatilization loss of the resultant topically applied urea, which method comprises the step of topically applying to the surface of said alkaline soil a fertilizing effective amount of a composition comprising a urea-sulfuric acid reaction product; which reaction product contains about 35 to about 85 weight percent sulfuric acid, about 5 to about 47 weight percent urea, and 0 to about 35 weight percent water, said urea and sulfuric acid, in combination, constitute at least about 65 weight percent of said reaction product, said reaction product has an $H_2SO_4$/urea molar ratio of at least about 0.7, and said composition is free of urea-sulfuric acid reaction by-products resulting from the decomposition of a member selected from the group consisting of urea, sulfuric acid, and combinations thereof.

17. The method defined in claim 16 wherein said alkaline soil has a pH of at least about 7.5, and said composition contains no detectable amount of a member selected from the group consisting of ammonium sulfamate, sulfamic acid, and combinations thereof.

18. The method defined in claim 16 wherein said alkaline soil has a pH of at least about 7.5.

19. The method defined in claim 16 wherein said alkaline soil has a pH of at least about 8.

20. The method defined in claim 16 wherein said composition is an aqueous solution of said reaction product, which solution comprises about 10 to about 100 weight percent of said reaction product.

21. A method for topically fertilizing alkaline soils with urea, which method comprises applying to the surface of an alkaline soil having a pH of at least about 7.5 an aqueous solution of the reaction product of urea and sulfuric acid, wherein the sulfuric acid/urea molar ratio in said solution is at least about 0.7, and said solution is free of urea-sulfuric acid reaction by-products resulting from the decomposition of a member selected from the group consisting of urea, sulfuric acid, and combinations thereof.

22. The method defined in claim 21 wherein said sulfuric acid/urea molar ratio is at least about 1.

23. A method for topically fertilizing alkaline soils with urea, which method comprises applying to the surface of an alkaline soil having a pH of at least about 7.5 an aqueous solution of a reaction product of urea and sulfuric acid, wherein the sulfuric acid/urea molar ratio in said solution is at least about 0.7.

24. The method defined in claim 23 wherein said sulfuric acid/urea molar ratio is at least about 1.

* * * * *